United States Patent
King

[15] 3,702,388
[45] Nov. 7, 1972

[54] OPTICAL VIEWING SYSTEM FOR WORK CHAMBERS

[72] Inventor: James R. King, Tustin, Calif.

[73] Assignee: Union Carbide Corporation, New York, N.Y.

[22] Filed: Nov. 9, 1970

[21] Appl. No.: 87,854

[52] U.S. Cl. .............................................219/121 EB
[51] Int. Cl. ..............................................B23k 15/00
[58] Field of Search.........219/121 R, 121 L, 121 EB; 118/7, 8; 350/19

[56] References Cited

UNITED STATES PATENTS

| | | | |
|---|---|---|---|
| 2,910,913 | 11/1959 | Michel | 350/19 |
| 3,156,810 | 11/1964 | Samuelson | 219/121 EB |
| 3,169,183 | 2/1965 | Radtke et al | 219/121 EB |
| 3,465,119 | 9/1969 | Larson | 219/121 EB |
| 3,497,665 | 2/1970 | Gerard | 219/121 EB |

*Primary Examiner*—J. V. Truhe
*Assistant Examiner*—Gale R. Peterson
*Attorney*—Paul A. Rose, Harrie M. Humphreys and Dominic J. Terminello

[57] ABSTRACT

An optical system for illuminating, viewing and aligning work in a vacuum chamber. The apparatus is predicated on the use of a clear or reflectively coated glass strip which becomes and remains a mirror surface as vapor from the material being worked is deposited on the glass surface. The duration of the permitted exposure is a function of the material type and the quantity of vapor released. The glass strip is then indexed to expose a new clear surface.

8 Claims, 4 Drawing Figures

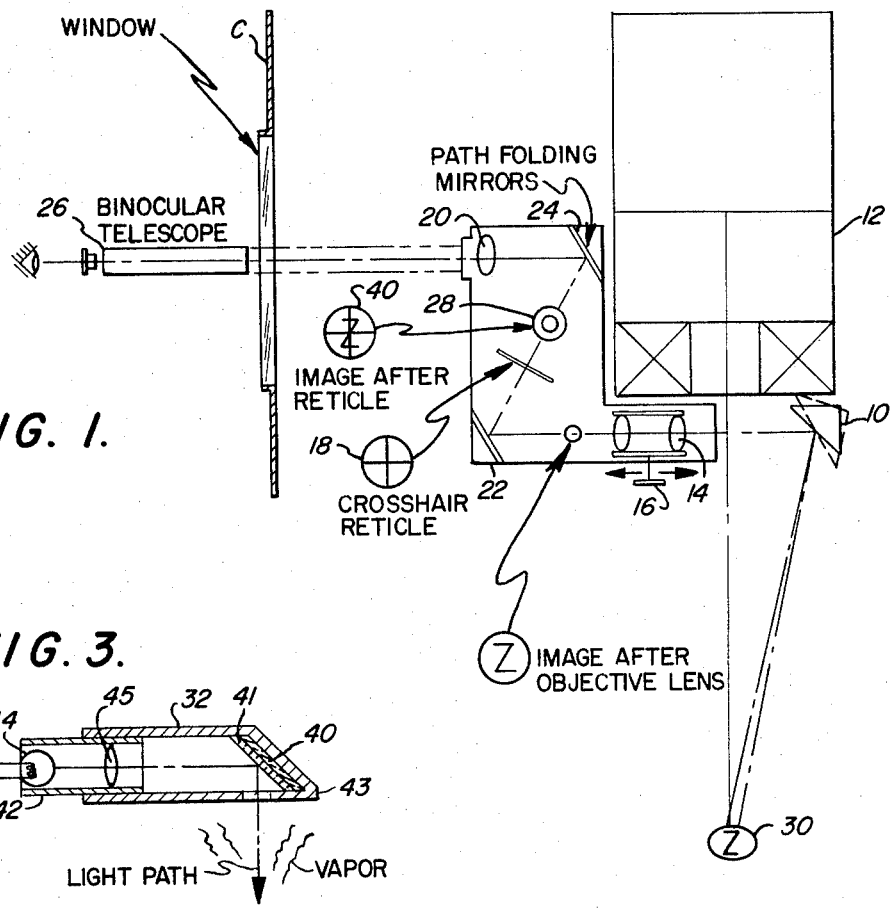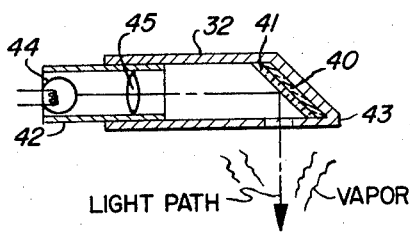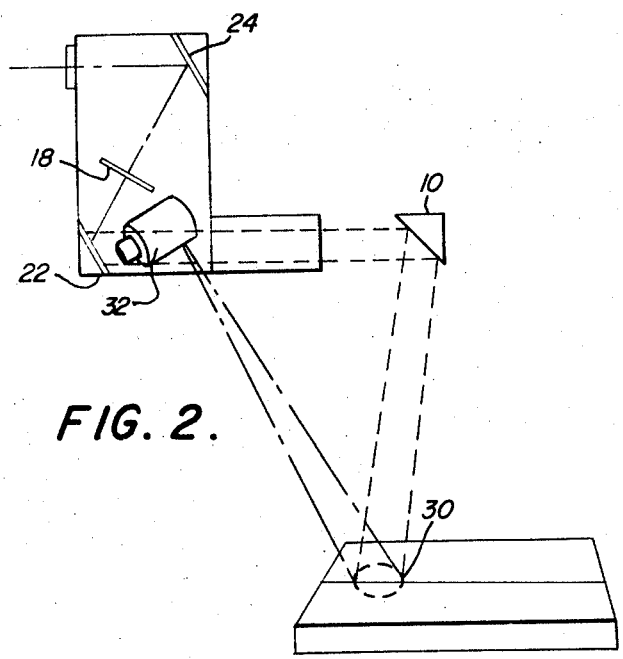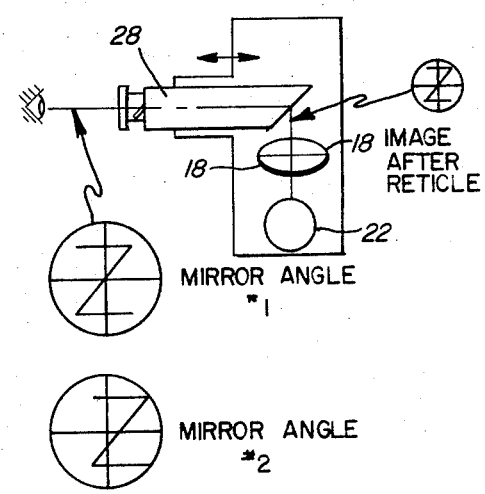

OPTICAL VIEWING SYSTEM FOR WORK CHAMBERS

This invention relates to an optical system for viewing a workpiece to be worked with a beam of energy, and more particularly to such a system for viewing a workpiece from outside a vacuum chamber in electron beam working of materials.

While the invention may be used with any beam source of energy wherein metallic vapors are given off by the workpiece, it is ideally suited for electron beam welding, cutting and machining, etc. of a metallic workpiece and for purposes of simplifying the description, reference will be made hereinafter to electron beams primarily.

Electron beam working is carried out in a sealed chamber under high vacuum. Thus, once the chamber is closed and the operation begun, there must be provided some system for viewing the workpiece. Generally, such systems must also provide a means for accurately aligning the joint to be worked with the electron beam. If the joint is not aligned with one of the axes of motion with the chamber open, it can never easily be realigned when the chamber is evacuated, and, therefore, out of the operator's reach.

The prior art contains several optical systems for aligning and viewing a workpiece. However, all of the prior art systems have one outstanding drawback. In every case, the prior art utilizes a highly polished metallic mirror surface to reflect the image of the workpiece back to a telescope outside the chamber. Also, in every case great care and elaborate systems have been designed to keep such highly polished metallic mirrors from receiving or coming in contact with the metallic vapors being generated by the workpiece being treated. Several prior art systems provide an apertured, highly polished mirror, mounted at approximately 45° to the electron beam, inside the electron beam gun itself, or a protective housing including a protective shutter to prevent vapor from reaching the mirror.

All of these procedures, obviously, add cost and/or complicated mechanisms to the electron beam machine.

The same metal vapors from the working operation that affect the optical system also act to cover any exposed surfaces and eventually cause all transparent members to become first translucent and finally opaque. Of the two types of illuminating systems now in use for optical systems, one projects the illumination through the same lenses used for the optical viewing path, and the other makes use of a light source projected directly at the surface of the work.

Since the vapors from the workpiece travel in line of sight paths, the exposed lens or bulbs of the light source pointed directly at the work are quickly plated with the vapors, and the light is diminished as the lens becomes translucent and almost completely blotted out as the coating density increases. Since the coating is reflective on the side of the lens or bulb facing the light source, the light is reflected back toward the source rather than transmitted toward the work. The same phenomena occurs when the light is directed through a viewing lens and the cover glass. Although the vapor improves the reflectivity of a surface, the same amount of vapor decreases the transmission of the light drastically. Since the viewing path depends upon the reflected light traveling back from the surface through the lenses to reach the viewer's eye, the brightness of the image being viewed depends upon the illumination initially placed on the surface. Any vapors on the cover glass or on the lenses that reduce the transmission of the illuminating light also necessarily reduce the light reflected back along the same path for viewing. An optical viewing system of the type universally used for the electron beam welding process is best described as an opaque projector. This means that when an opaque, but at least partially reflecting surface, is illuminated by a light source, a certain amount of the light will be scattered; however, a small percentage of the light will be reflected into the optical viewing system. The brightness of the image being viewed, therefore, is always much less than the brightness of illumination. The rather faint reflection from the surface may further be reduced by other losses that occur in the optical column such as reflection from lens surfaces or transmission reduction due to vapor coating of cover glass or lens surfaces in the optical path.

Accordingly, it is the main object of this invention to provide a simple, low cost, optical viewing and illuminating system for electron beam machines producing an image of maximum brightness for a substantial period of time.

A second object is to provide an optical system wherein the reflecting mirror is placed in the vicinity of the workpiece and is coated with the metallic vapors given off by the workpiece.

It is another object to provide an optical system which is unrestricted by apertures in the gun.

Yet another object is to provide a system of illumination separate from the optical viewing column, so that internal lens flare is avoided, but arranged in a manner so that the light intensity is maintained at an adequate level regardless of vapor deposition.

These and other objects will either be pointed out or become apparent from the following description and drawings wherein FIG. 1 is a schematic drawing of the various pieces of apparatus embodying one form of the optical system of the invention;

FIG. 2 is a schematic drawing of the optical system showing illumination sources mounted on the system;

FIG. 3 is a side schematic of the arrangement of the illumination system and its self-perpetuating mirror;

FIG. 4 is a side schematic view of the optical system showing the optical finder element.

As briefly mentioned above, all presently known viewing systems have utilized a mirror placed at approximately a 45° angle to the center line of the electron beam gun and mounted up inside the gun. The mirror reflects the surface of the workpiece along a line of sight to a magnifying eyepiece which is outside the chamber. These systems only permit viewing while welding for very few seconds, depending upon the amount of vapor generated by the process. The 45° mirror is usually protected from the metal vapors and other contaminants arising from the surface of the work during welding, by means of a cover glass which is placed some distance below the mirror, normal to the line of sight. As the evolution of metal vapors from the weld coats the surface of the cover glass very rapidly, the percentage of transmitted light is rapidly reduced. After the cover glass becomes opaque, it may be indexed through small increments to expose a new, clear surface of the glass. These new surfaces, in turn may last only a few seconds as well.

The same metal vapors from the working operation that affect the optical system also act to cover any exposed surfaces and eventually cause all transparent members to become first translucent and finally opaque. Of the two types of illuminating systems now in use for optical systems, one projects the illumination through the same lenses used for the optical viewing path, and the other makes use of a light source projected directly at the surface of the work.

The present invention provides an optical system which, for the first time, places the mirror system below the gun rather than up inside the gun and overcomes the above limitations by utilizing a 6-inch strip of coated or clear thin, flat glass or metal as the mirror, without any protective covering. It should be noted that the same system could operate from a position within the gun structure, but it is less desireable in such a position. The glass, or metal, is coated by the metallic vapor as the welding action begins and is maintained as a very adequate front surface mirror. The same thickness of vapor coating that would render a cover glass opaque to transmitted light, in the prior art systems, actually improves the reflection of light from the reasonably optically plane surface of the glass slide. The reflection capabilities of this mirror may last for a period of several minutes or even hours while welding aluminum, and somewhat less time when welding titanium, steel, and other materials. If the mirror surface becomes degraded, it is mechanically moved laterally a fraction of an inch to expose a clean surface, which then becomes coated and acts as a new mirror. As there is no cover glass to become occluded, the life of the mirror is only limited by the excessive build-up of vapors which, in the case of steel and similar materials result in a flaking action after about tens of seconds of operation. Thereafter, the glass, or metal, must be indexed to present a clear surface. The duration of the permitted exposure is a function of the material type and the quantity of vapor released from the melt.

Referring now to the drawings, in FIG. 1 the mirror assembly 10 is mounted on the lower end and depends from the electron beam gun 12. The mirror assembly 10 is pivotally mounted so that the angle may be varied from about 40° to about 50° for reasons to be explained hereinafter. The remainder of the optical system includes an objective lens 14 having a manual or motorized adjustment 16 to adjust its position to focus the virtual image of the mirror on the plane of the crosshair reticle 18. The reticle 18 may be either fixed, or moveable. A collimator lens 20 is mounted to view the crosshairs and produce a collimated beam of light of parallel rays having no distince focal point. Due to the absence of a focal point, the projected image can be viewed at any point along its path as a clear, complete image. These elements may be in a straight line or as shown in FIG. 1, mirrors 22 and 24 may be used to fold the path of light rays to conserve space.

Outside the work chamber C, or inside if required, and in line with the parallel rays of the collimator lens 20, is mounted a monocular or binocular magnifier 26, usually in the form of a telescope, which views the image projected by the internal optics through a window port. Magnification of the system may be varied by interchangeable eyepieces.

The same view that is seen by the external tele-scope 26 is also seen through an optical finder 28 mounted in the optical column of the optical system. The optical finder 28 consists of a right angle prism (or mirror) and a magnifying eyepiece. The assembly is mounted in a tube with an eyepiece at one end and prism at the other. The prism is inserted into the optical column above the crosshair reticle so that the optical finder views the image of the work surface which has been projected onto the plane of the crosshairs by the objective lens in the same manner as described for the operation of the collimating system. The viewer may then adjust the focus of the objective, select the desired field of view, and align the crosshair to the target. In operation, when the chamber C is opened, the operator may view the workpiece image 30 through optical finder 28 while he adjusts the workpiece location, because he now is in easy reaching distance of the work in the chamber. The optical finder allows a single operator to initially set up the system by aligning the crosshair image to the work, focusing the objective lens, selecting the field of view and adjustment of the illumination level and image.

Referring to FIG. 2, a lighting system provides two light sources 32, one on each side, to provide shadow control and illumination of the surface to be viewed. The light beams from two focusable projector type lights are directed into the self-coating mirror 10 mounted at an appropriate angle. The light sources themselves are mounted so that they may be adjusted angularly or linearly so that the reflected light may be properly directed on the work surface. The lights may also be projected on the work surface as described in FIG. 3.

FIG. 3 schematically shows the relationship between the light source and an associated self-perpetuating mirror.

In use, clear cover glass 41 covers mirror 40. Initially, the light originating at the bulb 44 goes through lens 45 and the cover glass 41 and is reflected 90° from the original light path toward the work surface. The mirror mount 43 is free to rotate relative to the housing so that the light output may be directed to any desired point on the work surface. As the work progresses, vapors plate the surface of the cover glass 41 protecting the mirror 40 forming a reflective surface, thereby, continuing the reflecting function of the mirror assembly. Since this surface is used for light reflection only rather than critical precision viewing, the coating may be allowed to accumulate without indexing and without inhibiting its function.

On the other hand, if the bulb 44 and lens 45 assembly were pointed toward the vapor source, they would become occluded by vapor plating in an extremely short time.

According to the concept of the invention, the mirror 10 is either directly in the line of sight of the operator or is in the optical line of sight after collimating lens 20, mirror 24, reticle 28, mirror 22, and objective lens 14. If the operator were using the naked eye to observe the reflected image of the work surface, the image would always be seen in focus. This is because the human eye automatically refocuses continuously to follow a moving object (a process known as accomodation).

When magnification of the image is required, which is usually the case, a magnifier in the form of a telescope is used by the operator to view the image in the mirror. A telescope has a definite focal length and must be adjusted to focus either near or far objects. Therefore, even though the telescope provides magnification, it defeats the ability if the eye to maintain continuous focus. The depth of focus of most optical instruments increases with increasing distance and decreases with decreasing distance. Therefore, the adjustment of focus at relatively close distances becomes critical.

The viewing distances are small in moderate electron beam work chamber sizes (6 inches to 60 inches as an example). In the case of a mirror optical system used with a moving gun, the mirror to telescope distance (X distance) may change continuously while welding with the gun. As a matter of less importance, the mirror to work distance (Z distance) may also be changed occasionally to accomodate changes in working distance of the electron beam gun.

In order for the optical system to automatically function in the same manner as the naked eye (accomodation), it is desirable that the system continuously maintain focus over the entire X axis movement for a given Z axis distance.

In the embodiment shown in FIG. 1, the telescope 26 is focused at infinity so that the output of the collimating lens 20 will always remain in focus even though the mirror 10 to telescope distance X is changed.

The mirror to work surface distance Z may be optically focused manually by the objective lens 14. The objective lens 14 is designed to focus over the usual welding range of 3 to 18 inches which means that the work surface may be manually brought into sharp focus within that range, although greater and lesser distances could be used. The objective lens is mounted so that it can be moved forward or backward in the optical tube.

The position of the objective lens 14 is regulated according to the distance of the object, so that the image falls on the plane of the crosshairs 18. Thus, the crosshairs and the image combine on the cross-hair plane (see 40, FIG. 1) so that the crosshairs appear at a certain point on the virtual image in the mirror. Therefore, they appear to the observer at a certain point on the object.

Because the mirror, the objective lens, and the crosshair reticle move together as a unit on the electron beam gun, the location of the crosshair, once set, may be made to unvaryingly represent the axis of the electron beam gun for a given gun to work distance.

The mirror assembly 10 is made variable to satisfy two purposes: A fixed mirror angle cannot cover the required field of view at the work surface over the designed variation of mirror to work distance. The expected range of adjustment of the mirror to cover the work surface at all distances is from about 20° to 70°. If this angle is made continuously variable, the apparent crosshair position relative to the image may be minutely adjusted to bring it to the center of the viewing field to coincide with the axis of the electron beam gun, or to view some off center point, a combination of linear and angular motion can be used to achieve this adjustment.

As will be noted from the above, the subject invention allows one man alone to view the crosshair position at the same time that he is in position to conveniently manipulate the piecepart location by making use of the optical finder eyepiece which is mounted in the optical system carried inside the chamber.

Having described the invention with reference to certain preferred apparatus and arrangements thereof, it should be understood that certain modifications may be made to such apparatus or the arrangements thereof without departing from the spirit and scope of the invention.

What is claimed is:

1. In metal working apparatus, employing an energy beam generating gun, including an electromagnetic lens for working metals which give off metallic vapors, the combination with a vacuum work chamber within which said gun is mounted for adjustable movement in vertical and horizontal directions and worktable means located in said vacuum work chamber for supporting metallic workpieces for movement horizontally in the X and Y directions; of an optical system for viewing the workpiece including an unprotected mirror assembly mounted on, and depending from the lower end of said beam generating gun, and including a mirror for reflecting light rays from the surface of the metal to be worked;

said mirror being coated by said metallic vapor from said metallic workpiece as the beam working operating proceeds to temporarily maintain an adequate mirror surface; indexing means in said mirror assembly for exposing a new mirror surface when the exposed surface becomes degraded;

and a telescope located outside of said chamber and being so positioned as to view the image reflected by said mirror.

2. Apparatus according to claim 1 wherein said mirror assembly is pivotally mounted on said gun.

3. Apparatus according to claim 1 including an objective lens; a crosshair reticle located in the path of the image forming rays passed by the objective lens whereby said image and crosshairs are superimposed; and a collimating lens which collimates and directs the rays of the image and crosshairs to said telescope.

4. Apparatus according to claim 3 having an optical finder located between said objective lens and said collimating lens to view said superimposed crosshair and image such that an operator may make adjustments to said objective lens while viewing said superimposed images through said optical finder.

5. Apparatus according to claim 3 wherein illumination sources are mounted adjacent said objective lens so that the rays of light are projected into said mirror assembly for reflection to the workpiece.

6. Apparatus according to claim 3 including an illumination source comprising a housing, a bulb mounted in said housing and a mirror located in said housing and at an angle to the optical axis of said bulb for reflecting light from said bulb through an aperture in said housing, said mirror being free to rotate relative to said housing to direct the reflected light at any desired spot.

7. Apparatus according to claim 1 including a reflecting system between said mirror assembly and said telescope, comprising an objective lens; a first reflective surface to reflect the image forming rays passed by the objective lens at about 45°; a crosshair reticle located in the path of said reflected image forming rays whereby said image and crosshairs are superimposed, a second reflective surface which reflects the image and crosshairs at about 45°, and a collimating lens which collimates and directs the rays of the reflected image and crosshairs to said telescope.

8. In metal working apparatus, employing an energy beam generating gun, including an electromagnetic lens for working metals which give off metallic vapors, the combination with a vacuum work chamber within which said gun is mounted for adjustable movement in vertical and horizontal directions, and worktable means located in said vacuum work chamber for supporting metallic workpieces for horizontal movement thereof; of an optical system for viewing said workpiece comprising an unprotected mirror assembly mounted on, and depending from the lower end of said beam generating gun, and including a clear glass slide which is transformed into a mirror surface as metallic vapors are collected on said glass slide for reflecting light from the surface of the metal to be worked; indexing means in said mirror assembly for exposing a new surface of said glass slide when the exposed surface becomes degraded;

and a telescope located outside said chamber and being positioned to view the image reflected by said mirror surface.

\* \* \* \* \*